United States Patent [19]

Boney

[11] Patent Number: 4,573,117

[45] Date of Patent: Feb. 25, 1986

[54] METHOD AND APPARATUS IN A DATA PROCESSOR FOR SELECTIVELY DISABLING A POWER-DOWN INSTRUCTION

[75] Inventor: Joel F. Boney, Austin, Tex.

[73] Assignee: Motorola, Inc., Schaumburg, Ill.

[21] Appl. No.: 549,957

[22] Filed: Nov. 7, 1983

[51] Int. Cl.[4] ............................................. G06F 1/04
[52] U.S. Cl. ...................................................... 364/200
[58] Field of Search ............... 365/226, 227; 364/707, 364/200 MS File, 900 MS File

[56] References Cited

U.S. PATENT DOCUMENTS

| | | | |
|---|---|---|---|
| 4,137,563 | 1/1979 | Tsunoda | 364/200 |
| 4,203,153 | 5/1980 | Boyd | 364/200 |
| 4,204,249 | 5/1980 | Dye et al. | 364/200 |
| 4,279,020 | 7/1981 | Christian et al. | 364/900 |
| 4,293,927 | 10/1981 | Hoshii | 364/900 |
| 4,365,290 | 12/1982 | Nelms et al. | 364/200 |
| 4,381,552 | 4/1983 | Nocilini et al. | 364/900 |

Primary Examiner—James D. Thomas
Assistant Examiner—William G. Niessen
Attorney, Agent, or Firm—Anthony J. Sarli, Jr.; Jeffrey Van Myers

[57] ABSTRACT

A method for allowing the user of a data processor having a power-down instruction to selectively disable the power-down instruction. In the preferred circuit, the user stores a special code in a control register indicating that the power-down instruction is to be disabled. Upon a power-down instruction being subsequently executed, the processor is precluded by the code from turning off the oscillator which provides the system clocks. The processor thus proceeds to the next instruction as if the power-down instruction were a "no-operation" instruction.

5 Claims, 3 Drawing Figures

METHOD AND APPARATUS IN A DATA PROCESSOR FOR SELECTIVELY DISABLING A POWER-DOWN INSTRUCTION

CROSS REFERENCE TO RELATED APPLICATIONS

Related subject matter is contained in copending application Ser. No. 549,956, filed simultaneously herewith and assigned to the same assignee.

TECHNICAL FIELD

The present invention relates generally to data processors, and, more particularly, to a method and circuit in a data processor for selectively disabling a power-down instruction.

BACKGROUND ART

In data processing systems capable of simultaneously supporting more than one user, no user-accessible mechanism is provided for powering down the processor under program control. Thus, for example, in such main frame type processors as the Digital Equipment Corporation's PDP 11/70 and the International Business Machine's System 370, no power-down instruction is provided.

Even in those systems capable of supporting only a single user, the dynamic nature of the circuitry typically used in the processor prevents the implementation of a power-down instruction. Typical of such systems are those in which the processor is a single-chip microprocessor fabricated using exclusively N-channel MOS transistors, such as the Intel 8080 or Motorola's 6800. Since the logic in these types of microprocessors is primarily dynamic rather than static, the "current" state information and the "data" stored in the processor's registers would be lost in the event of a power-down.

As MOS technology advanced to the point where large-scale integration became feasible using complementary P-channel and N-channel MOS transistors, it became possible to fabricate a microprocessor using static logic. With the introduction of the worlds first CMOS microprocessor, Motorola's MC146805E2, the user was first given the capability to power-down the processor under program control. In this processor, the user was even given the choice of two distinct power-down levels. For example, using a "WAIT" instruction, the user could greatly reduce operating power by disabling the clock outputs provided by the on-chip oscillator while allowing the oscillator to continue operating. In contrast, using a "STOP" instruction, the user could disable the oscillator itself to save maximum operating power. In either event, the clocks/oscillator would be reenabled to restart the processor in response to either a manually generated reset signal or a peripheral generated interrupt signal.

Although the availability of these power-down instructions was widely accepted among users and often copied by other microprocessor manufacturers, those applications requiring very high reliability had to be very carefully designed and rigorously tested to assure that the STOP instruction in particular could not be inadvertently executed in the event of a program error condition. However, it has been possible, using good programming practices and thorough debugging and testing, to utilize this type of microprocessor even in such demanding applications as heart pacemakers and other intrusive medical environments. On the other hand, the user's risks could be further reduced if some heretofore unavailable mechanism were provided to disable, either absolutely or selectively, such power-down instructions.

SUMMARY OF THE INVENTION

Accordingly, it is an object of the present invention to provide a method and a circuit for use in a data processor having a power-down instruction to disable that power-down instruction.

Another object of the present invention is to provide a method and a circuit for use in a data processor having a power-down instruction for selectively disabling that power-down instruction.

Yet another object of the present invention is to provide a method and a circuit which allows the user of a data processor having a power-down instruction to selectively disable that power-down instruction under program control.

These and other objects and advantages of the present invention are achieved in a data processor comprising: an oscillator which provides a periodic clock signal except in response to receiving a power-down signal; reset logic which provides a reset signal in response to a predetermined condition; and instruction execution control logic, operative in synchronism with the clock signal, for receiving each of a plurality of different instructions comprising an instruction stream, and, in response to receiving a predetermined power-down instruction in the instruction stream, providing the power-down signal to the oscillator to terminate the clock signal until the reset logic next provides the reset signal, so that the instruction execution control logic proceeds to a next instruction in the instruction stream only upon resumption of the clock signal. According to the present invention, the processor includes a circuit for selectively disabling the power-down instruction, comprising: a control register which stores a predetermined control code in response to the instruction execution control logic receiving a different predetermined one of the instructions in the instruction stream; and additional control logic which responds to the control code being stored in the control register by preventing the instruction execution control logic from providing the power-down signal to the oscillator in response to the power-down instruction, so that the oscillator will continue to provides the clocks and the instruction execution control logic will simply proceed to the next instruction in the instruction stream.

DESCRIPTION OF THE INVENTION

In a conventional data processor having a power-down instruction, upon any such power-down instruction being loaded into the processor for execution, a power-down signal will be asserted to power-down the processor. Typically, the power-down signal will disable the oscillator responsible for providing the system clocks. Without clocks to control instruction execution sequencing, the processor will remain in the same state present at the time the power-down signal was asserted. However, certain portions of the processor, such as the master reset circuitry and, in most cases, the peripheral interface circuitry responsible for monitoring interrupt signals from external resources, will still respond to the respective conditions. Upon the occurance of any of these special events, the power-down signal will be negated to enable the oscillator to again provide the system clocks. At the appropriate point in the renewed clock sequence, the next instruction is loaded into the processor for execution.

Figure 1:
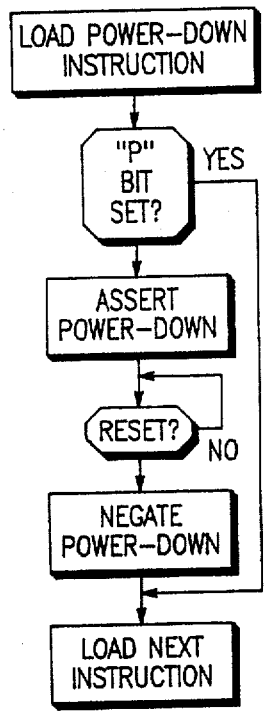
FIG. 1 is a flow diagram which illustrates the preferred method for selectively disabling a power-down instruction in accordance with the present invention.

In the preferred method shown in FIG. 1, the instruction execution control sequence for the power-down instruction has been modified so that the processor checks the state of a power-down control bit "P" immediately after the power-down instruction is loaded into the processor for execution. If the P bit is determined to be in a particular state, say "set", then the processor simply proceeds to load the next instruction just as if the power-down instruction were a "no-operation" instruction. On the other hand, if the P bit is "clear", then the processor will perform the conventional power-down sequence. Thus, the power-down instruction can be disabled by taking whatever steps may be required to "set" the P bit.

While various mechanisms for "setting" the P bit will readily occur to those skilled in the art, most such techniques will simply be variations on a few basic designs. For example, if the user desires that the power-down instruction be permanently disabled, then the manufacturer may fabricate the microprocessor with the P bit permanently set, such as by selecting an appropriate mask option before fabrication. On the other hand, if the user desires the option to utilize the same microprocessor in differing applications, one requiring the power-down instruction and another demanding the absence of the power-down instruction, then a user-accessible mechanism for "setting" the P bit may be provided. For example, a permanent mechanism may be realized by implementing the P bit as an externally actuated fuseable link or as a programmable read-only memory cell, while a semi-permanent mechanism may be provided by using one of the several types of modifiable read-only memories such as EPROM or EEPROM. However, none of these techniques are suitable when the user's application is such that the power-down instruction is desired while the processor is operating in one mode but unacceptably dangerous while the processor is operating in another mode. It is the latter type of situation that the program selectable form of the present method is particularly well adapted to satisfy.

Figure 3:
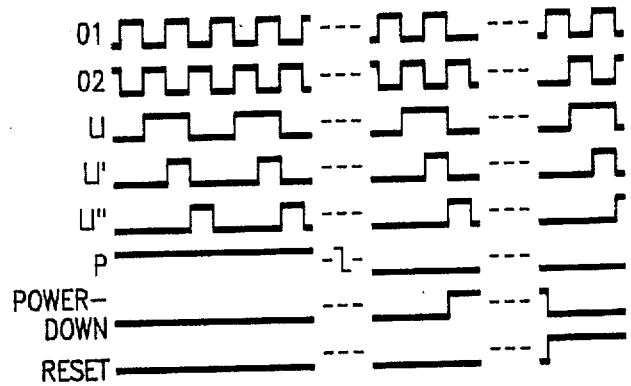
FIG. 3 is a timing diagram useful in understanding the operation of the circuit of FIG. 2.
Figure 2:
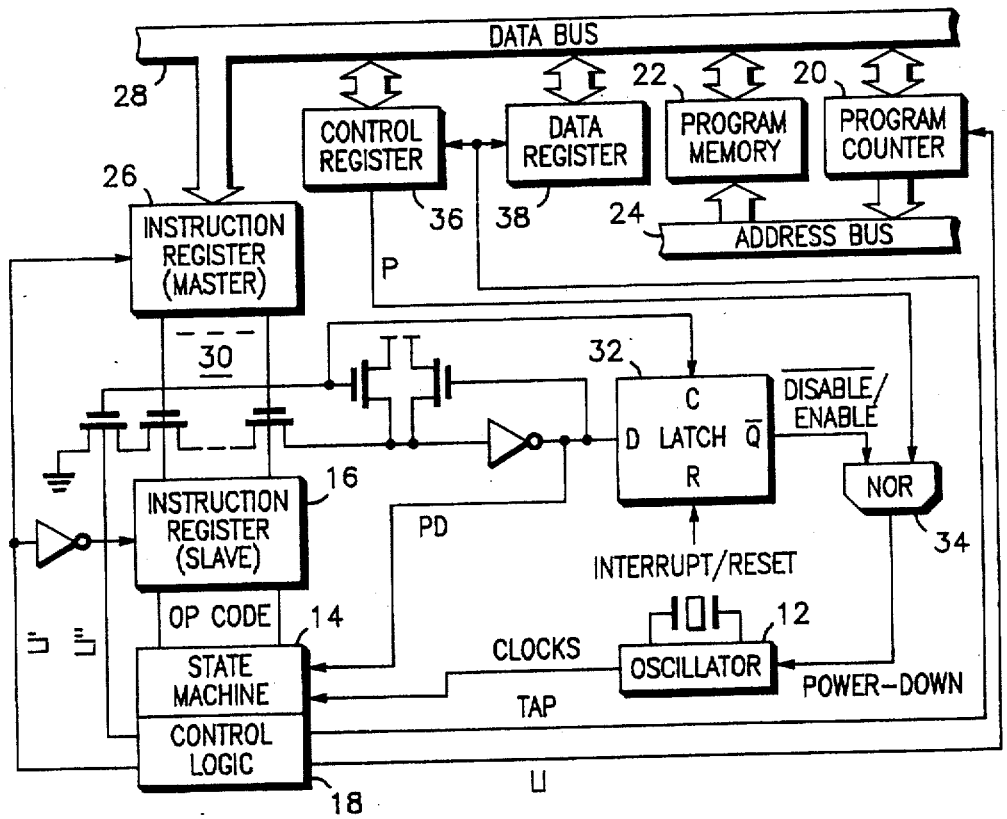
FIG. 2 is a preferred circuit for implementing the method shown in FIG. 1 in a CMOS microprocessor.

Shown in FIG. 2 are relevant portions of a data processor 10 having a power-down instruction which may be selectively disabled under program control. In the illustrated form, an oscillator 12 provides periodic system clocks ($\phi 1$ and $\phi 2$ in FIG. 3) to each of the several operating components of the processor 10. A state machine 14, operating generally in synchronism with the clocks, responds in a conventional manner to each instruction opcode loaded into a slave portion 16 of an instruction register. In general, the state machine 14 coordinates and sequences the operation of the processor 10 using control logic 18, so that all of the timing and control signals appropriate for the particular instruction are generated at the proper time. At the end of each instruction execution sequence, state machine 14/control logic 18 provides a load instruction (LI) signal to enable a program counter 20 to provide to a memory 22 via an address bus 24 the address of the next instruction in the instruction stream. After a $\phi 2$ delay, state machine 14/control logic 18 provides an instruction register control signal LI' to enable a master portion 26 of the instruction register to load the next instruction which has just been provided by the memory 22 on a data bus 28. On the following $\phi 1$, state machine 14/control logic 18 provides an instruction decoder control signal LI" to enable an instruction decoder 30 to decode the new instruction. At substantially the same time, state machine 14/control logic 18 negates the control signal LI' thereby enabling the slave portion 16 to load the next instruction. Using the output from decoder 30 to select the initial state appropriate for the new instruction, state machine 14 then begins executing the new instruction.

Assume now that the illustrated portion of instruction decoder 30 signals that the instruction just loaded into the master portion 26 is the power-down instruction by asserting a power-down (PD) signal to state machine 14. Simultaneously, the LI" signal enables a latch 32 to latch the state of the power-down signal. Since the power-down signal will be asserted, latch 32 will assert a disable (DISABLE) signal. In a conventional processor 10, the DISABLE signal would be coupled directly to oscillator 12, thereby terminating the clocks. Only upon receiving either a RESET or INTERRUPT signal would latch 32 be reset. Once latch 32 resets and negates the DISABLE signal, oscillator 12 will again provide the clocks.

In the preferred embodiment, however, a NOR gate 34 is interposed between latch 32 and oscillator 12 to prevent the DISABLE signal from reaching oscillator 12 if the state of a power-down bit "P" in a control register 36 is "set". Thus, the power-down instruction may be selectively disabled by the user simply by loading a binary one (1) into the "P" bit position of condition register 36. In the illustrated form, this is accomplished by loading a suitable binary bit pattern into a special data register 38, sometimes referred to as an accumulator, using conventional instructions. Immediately thereafter, a special "transfer accumulator to processor control register" (TAP) instruction must be executed to cause state machine 16/control logic 18 to provide a TAP signal to enable the transfer of the bit pattern from data register 38 into the control register 32 via data bus 28. Since the odds that these two instructions will be executed sequentially by an errant program is only one in sixteen million, this mechanism provides very satisfactory protection against inadvertant power-down for most applications.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

I claim:

1. In a data processor comprising:
   oscillator means for providing a periodic clock signal except in response to receiving a power-down signal;
   reset means for providing a reset signal in response to a predetermined condition; and instruction execution control means, operative in synchronism with said clock signal, for receiving each of a plurality of different instructions comprising an instruction stream, and, in response to receiving a predetermined power-down instruction in said instruction stream, providing said power-down signal to said oscillator means to terminate said clock signal until said reset means next provides said reset signal, said instruction execution control means proceeding to a next instruction in said instruction stream only upon resumption of said clock signal;

a circuit for selectively disabling said power-down instruction, comprising:

control register means for storing a predetermined control code in response to said instruction execution control means receiving a different predetermined one of said instructions in said instruction stream; and logic means responsive to said control code being stored in said control register means, for preventing said instruction execution control means from providing said power-down signal to said oscillator in response to said power-down instruction, whereby said instruction execution control means will simply proceed to said next instruction in said instruction stream.

2. The data processor of claim 1 further comprising:
data register means for storing said predetermined code in response to said instruction execution control means receiving a third predetermined one of said instructions is said instruction stream, and for providing said predetermined control code in response to said instruction execution control means receiving said different predetermined one of said instructions in said instruction stream; and wherein said control register means are further characterized as receiving said predetermined control code from said data register and then storing said received predetermined control code in response to said instruction execution control means receiving said different predetermined one of said instructions in said instruction stream.

3. The data processor of claim 1 wherein said instruction execution control means includes latch means for asserting a disable signal in response to said instruction execution control means receiving said power-down instruction, and for negating said disable signal in response to said reset signal; and wherein said logic means includes gate means for providing said power-down signal to said oscillator in response to the assertion of said disable signal, but only if said predetermined control code is not stored in said control register.

4. In a data processor which powers down in response to executing a power-down instruction, a method for selectively disabling said power-down instruction comprising the steps of:

selectively storing in a predetermined location a control code indicating that said power-down instruction is to be disabled; and preventing said processor from powering-down in response to executing said instruction if said control code has been stored in said predetermined location.

5. In a data processor comprising:

oscillator means for providing a periodic clock signal except in response to receiving a power-down signal;

reset means for providing a reset signal in response to a predetermined condition; and instruction execution control means, operative in synchronism with said clock signal, for receiving each of a plurality of different instructions comprising an instruction stream, and, in response to receiving a predetermined power-down instruction in said instruction stream, providing said power-down signal to said oscillator means to terminate said clock signal until said reset means next provides said reset signal, said instruction execution control means proceeding to a next instruction in said instruction stream only upon resumption of said clock signal;

a method for selectively disabling said power-down instruction, comprising:

storing a predetermined control code in response to said instruction execution control means receiving a different predetermined one of said instructions in said instruction stream; and in response to said control code being stored in said control register means, preventing said instruction execution control means from providing said power-down signal to said oscillator in response to said power-down instruction.

* * * * *